3,022,144
METHOD OF PREPARING SINGLE CRYSTAL MATERIALS
Arrigo Addamiano, Willoughby, Ohio, assignor to General Electric Company, a corporation of New York
Filed Mar. 17, 1958, Ser. No. 721,965
4 Claims. (Cl. 23—294)

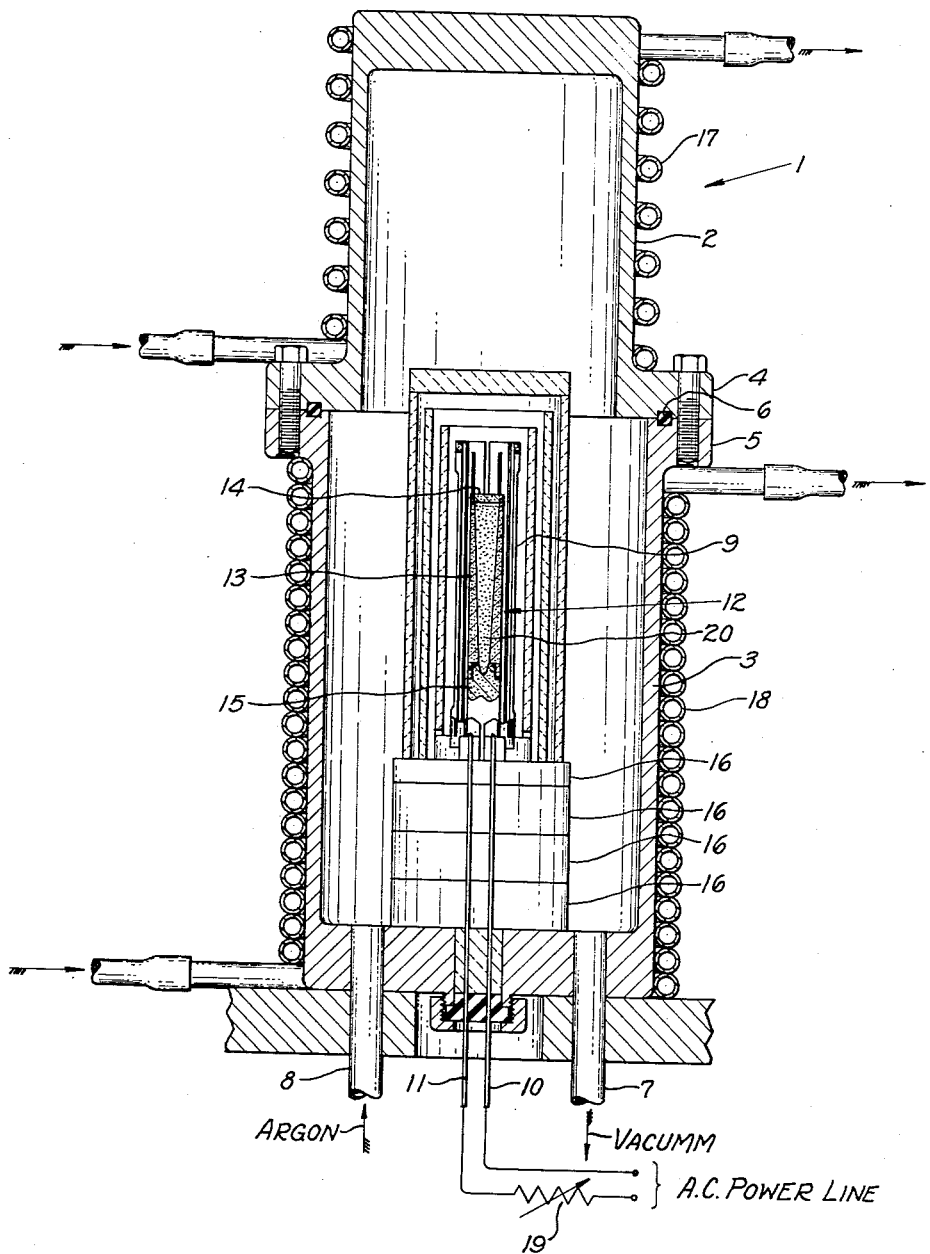

This invention relates to a method of preparing single crystals of zinc sulfide and zinc sulfide phosphors. Because zinc sulfide is—or can be made to be—photoluminescent, electroluminescent, triboluminescent, piezoelectric, pyroelectric, photoconducting and the like, different methods of growing zinc sulfide single crystals have been attempted.

Of these the so-called sublimation method leads to acicular crystals, or to plates, which may be too fragile for many applications. The hydrothermal method has furnished, as far as it is known, only crystals of microscopic size; the maximum linear dimension being about five microns.

Due to the very high melting point of zinc sulfide, and the belief, documented in some of the old literature, that a pressure of 100–150 atmospheres is needed to melt the zinc sulfide, the growth of zinc sulfide crystals by the melting and controlled cooling of the melted zinc sulfide was considered impractical.

It is therefore an object of this invention to provide an improved method for growing zinc sulfide crystals of such a size and possessing physical properties which will make them useful for many applications.

In accordance with the present invention, I have discovered that zinc sulfide can be melted at a relatively low pressure, above 50 p.s.i. and preferably about 150 p.s.i., and then cooled to fuse the zinc sulfide and form large single crystals provided that closed or covered containers or vessels having very restricted openings, and made of nonreactive material, are used. The pressure generated inside the vessel is balanced by an equivalent external pressure, so no substantial losses due to evaporation are met and crystals of good size and dimension can be grown. The gas atmosphere in the pressure vessel should be such as to eliminate any chance of chemical reaction with the materials present in the vessel.

The method of carrying out the invention will best be understood from the following discussion and the accompanying drawing, wherein, the drawing illustrates one modification of a pressure vessel or bomb suitable for practicing the instant invention.

Referring to the drawing, there is shown a bomb as used in the practice of the present invention. The bomb comprises a closed pressure vessel 1 including an upper housing member 2 and a lower housing member 3 secured together in airtight relation by the flanges 4, 5 respectively and the O-ring 6. The air within the bomb may be evacuated through the exhaust or vacuum line 7 and the bomb filled with an inert gas, such as argon, helium, xenon, krypton, nitrogen, or the like, under a pressure of above 50 p.s.i.; 150 p.s.i. or more produces good results. The gas enters the bomb 1 through inlet tube 8. A heating element 9 is contained within the bomb, which, as shown, consists of a carbon resistance obtained by cutting parallel slots in a cylinder of carbon in such a way as to obtain a zigzag of circular cross section; however, any suitable heating element may be used, for example, an alundum coated molybdenum resistance has been used. The heating element is secured to electrical leads 10, 11, which pass in insulated, sealed relation through the bomb wall.

The material to be melted is placed in containers or crucibles 12, made, for example, of spectroscopically pure graphite, so as to substantially fill the container. The crucibles may be heat treated in vacuum to eliminate volatile impurities and may also be chemically cleaned by overnight immersion in a mixture of four parts of concentrated nitric acid with one part of concentrated hydrofluoric acid and then repeatedly washed with deionized water. Other crucibles were found suitable, and the fusion will occur smoothly in crucibles, for example, of carbon, graphite, boron, nitride and alumina. The crucible 12 comprises a tapered body section 13 and end plugs 14 and 15 which may be threaded into the body section. The end plugs are not airtight in the container, but serve merely to confine the gases generated upon heating of the material within the container. After the crucible 12 is removed from the bomb, the zinc sulfide crystal may be released by removing the end plugs 14, 15 and pushing the crystal through the top of the crucible.

The crucible and heating element are supported on refractory bricks having good electrical insulating characteristics, such as a series of magnesium oxide bricks 16. The furnace, as constructed, is surrounded by three radiation shields, made of refractory materials such as boron nitride, graphite and alumina; however, many other materials have been successfully used. The walls of the bomb are cooled by circulating a coolant, such as water, through cooling coils 17, 18 encircling the bomb sections. While crucibles of different size were tried, and may be used, a substantially filled crucible which contained about 4 g. of powdered zinc sulfide was found to be satisfactory. This yields about 1 cc. of a fused zinc sulfide crystal (of theoretical density 4.1 g./cc.). Crystals so prepared are either single crystals all through or are made of large crystals blocks held together so that the process of the instant invention can supply large single crystals useful for practically any physical requirement. The leads 10, 11 are connected to a power source, such as a 110 or 220 volt A.C. power line, a rheostat 19 being placed in the line to control the current flow to the heating element and thereby regulate the rate of heating and cooling.

In operation, powdered material 20 to be melted is placed within the crucible, to substantially fill it, the crucible is closed at both ends and the bomb is assembled as shown in the figure. Electrical power is supplied to the heating element 9 through leads 10 and 11 and is regulated by the rheostat 19 so as to heat the furnace and bring the powdered material to above its melting temperature for a time period sufficient to insure that all the zinc sulfide has melted. The melting point of zinc sulfide is apparently only slightly dependent on pressure and is about 1830° C. under a pressure of 150 p.s.i. A slightly higher temperature is attained to make sure that all the zinc sulfide has melted and to eliminate unwanted crystallization seeds. While the upper limits of the heating temperature is not critical for the purpose of practicing this invention no particularly advantage lies in heating the zinc sulfide above about 1900° C.

By substantially filling the crucible with a powdered mass of zinc sulfide, and plugging the ends of the crucible, the gases developed by heating the mass are retained within the crucible under uniform controlled heat and pressure both during the heating cycle and the subsequent cooling cycle. Since the walls of the crucible are at almost uniform temperature, very much the same as that of the mass of zinc sulfide due to the heat radiation shields surrounding the crucible, the zinc sulfide is prevented from condensing on the crucible walls from a gaseous or sublimated state. Consequently during cooling of the melted mass, the zinc sulfide passes through the liquid stage to a fused single crystal form.

The melted sulfide is cooled at a predetermined and controlled rate; it has been found that to reduce the power supplied to the heating element to zero in approximately two and a half hours produces a satisfactory crystal; this is an average cooling rate of about 0.2° C. per second or 12° C. per minute.

It has been found that slow cooling makes better, larger single crystals; rapid or very rapid cooling produces a mass of separate crystals rather than a single crystal. The cooling rate should be controlled both during the transformation of the zinc sulfide from the liquid to the solid phase and below such temperature, particularly in view of the possibility of a transition from $\alpha$-ZnS (wurtzite) to $\beta$-ZnS form (blende). This transition has been reported to be around 1020° C. A too rapid cooling rate during the transformation to the solid phase may produce many small individual crystals; too rapid cooling in proximity of the transformation point $\alpha \rightarrow \beta$ may cause the crystal to fracture due to the difference in the coefficient of expansion of the $\alpha$ and $\beta$ phases. The exact cooling time, however, is not very critical and the melted sulfide may suitably be cooled at an average cooling rate of about 0.2° C. to about 0.05° C. per second with good results.

Pure powdered zinc sulfide or zinc sulfide powders having activator type impurities may be used as the starting material. In the examples below, the powder was melted in a spectroscopically pure graphite crucible, and the zinc sulfide was then permitted to cool to room temperature during a period of about two and a half hours.

The specific examples below are given to illustrate crystals which have been prepared by the method according to the present invention and are not given by way of limitation.

*Example 1.*—Pure zinc sulfide. The pure zinc sulfide crystals were prepared using pure zinc sulfide powder as a starting material. Tapered cylindrical rods (having the shape of the containers) were obtained, some over 2 cm. long. The single crystals showed only a slight yellow-green coloration at the top of the rods, due to the presence of contaminants spectroscopically detectable in the original ZnS powder. A typical preparation produced a crystal 15 to 20 mm. long. The crystals were transparent over all their length. Under exposure to radiation of 3650 A. they generally showed a green luminescence followed by long green afterglow.

*Example 2.*—ZnS:Cu, Br. This phosphor was prepared from an electroluminescent ZnS:Cu ($1.5 \times 10^{-3}$ mols), Br ($10^{-4}$ mols) powder. Before melting, the powder possessed a blue fluorescence under 3650 A. excitation. After melting it gave dark brown rods only partly transparent on account of the great concentration of copper in the original powder. The upper part of the single crystals was darker than the central part. Under 3650 A. there was, after crystallization, a moderately bright blue-green fluorescence. When the excitation was eliminated, a beautiful blue phosphorescence could be seen. A weaker response under 2537 A. and X-rays was also visible. The crystals were found to be electroluminescent. The light emitted after application of an electric field could be seen at a threshold of 3000 volts per cm., and 60 cycles. The thermoluminescence of the phosphor appeared to be blue and bright at liquid nitrogen temperature.

*Example 3.*—A zinc sulfide powder activated by 1% Mn was melted in a crucible of spectroscopically pure graphite, and cooled to room temperature in about three hours. The single crystal obtained, of orange color, and having the shape of the container, glowed very brightly under X-rays and 3650 A. excitation. The emission was in the yellow-orange. After the ultraviolet excitation was stopped, a long bright afterglow could be seen.

Generally, the clearest phosphors were obtained when the activator had a complete, or almost complete miscibility in the zinc sulfide. Phosphors containing almost insoluble activators such as those activated by $10^{-3}$ Cu, gave colored melts and showed a definite tendency for the activators to concentrate in the liquid phase. This also points out the possibility of eliminating unwanted impurities at one end of the crystal rods so as to obtain an even purer zinc sulfide than the best grades now available on the market. As outlined above, zinc sulfide crystals having very interesting properties may be prepared by the method just described. The salt, in fact, is not only luminescent and electroluminescent, but has been found to be piezoelectric, pyroelectric and have rectifying properties. Crystals prepared as described in the above examples can be cut by a diamond saw to a given geometrical shape, e.g. cubes, 4 mm. on each side. If pressure contacts or evaporated electrodes are put on opposite sides of the cubes, these can then be used as components in electric circuits. Pure zinc sulfide is also a good insulator and may have use as a refractory material and for the construction of scintillator counters. It may also find application in photosensitive devices. Long decay zinc sulfide phosphors can also be used for storage of information or for storage of solar energy.

While many modifications will occur to those skilled in the art, the invention is to be limited only by the claims annexed to and forming a part of this specification.

What I claim as new and desire to secure by Letters Patent of the United States is:

1. The method of producing single crystals of zinc sulfide and zinc sulfide phosphors which comprises heating a mass of material of the group consisting essentially of pure zinc sulfide and zinc sulfide phosphor containing activating impurities of luminescence in a closed container maintained in an inert atmosphere at a pressure under 100 atmospheres and above about 50 p.s.i. to a temperature at least about 1830° C. while retaining the products of such heating in the container for a time sufficient to melt the said mass and then gradually cooling the heated mass while maintaining said pressure to carry it to a fused single crystal form.

2. The method of producing single crystals of zinc sulfide and zinc sulfide phosphors according to claim 1 wherein the said heating temperature is about 1830° C. and the said pressure is about 150 p.s.i.

3. The method of producing single crystals of zinc sulfide and zinc sulfide phosphors according to claim 1 wherein the pressure of the inert atmosphere is of the order of 150 pounds per square inch.

4. The method of producing single crystals of zinc sulfide and zinc sulfide phosphors according to claim 1 wherein the cooling of the heated mass is carried out at a rate of about 0.2° C. to about 0.05° C. per second.

References Cited in the file of this patent

UNITED STATES PATENTS 2,874,128    Wachtel _____ Feb. 17, 1959

OTHER REFERENCES

Reynolds: Physical Review, vol. 79, pages 543–544 (1950).

Czyzak: J. Applied Physics, vol. 23, pages 932 to 933 (1952).

Addamiano et al.: Journ. Phys. Chem., vol. 61, July 1957, pages 1020 and 1021.

Mellor: "Inorganic and Theoretical Chemistry," vol. 4, page 589, 1923.